United States Patent
Schwager

(10) Patent No.: US 8,934,860 B2
(45) Date of Patent: Jan. 13, 2015

(54) METHOD FOR DETECTING AN INGRESS OF A SHORT-WAVE RADIO SIGNAL IN A POWER LINE COMMUNICATION SYSTEM AND POWER LINE COMMUNICATION MODEM

(75) Inventor: Andreas Schwager, Waiblingen (DE)

(73) Assignee: Sony Corporation, Tokyo (JP)

( * ) Notice: Subject to any disclaimer, the term of this patent is extended or adjusted under 35 U.S.C. 154(b) by 291 days.

(21) Appl. No.: 13/058,018

(22) PCT Filed: May 8, 2009

(86) PCT No.: PCT/EP2009/003303
§ 371 (c)(1), (2), (4) Date: Feb. 8, 2011

(87) PCT Pub. No.: WO2010/017854
PCT Pub. Date: Feb. 18, 2010

(65) Prior Publication Data
US 2011/0142110 A1    Jun. 16, 2011

(30) Foreign Application Priority Data
Aug. 11, 2008   (EP) .................................... 08014312

(51) Int. Cl.
H04B 3/54    (2006.01)

(52) U.S. Cl.
CPC .......... *H04B 3/54* (2013.01); *H04B 2203/5466* (2013.01); *H04B 2203/5495* (2013.01)
USPC ........... 455/402; 375/224; 375/225; 375/226; 375/227; 375/222; 307/1; 307/2; 307/3; 307/7; 455/41.1; 455/114.2; 455/114.3

(58) Field of Classification Search
CPC .............. H04B 3/50; H04B 3/54; H04B 3/56; H04B 2203/5462; H04B 2203/5466
USPC .......... 340/332, 333, 338, 359; 375/222, 225, 375/227, 257; 370/252, 442, 458
See application file for complete search history.

(56) References Cited

U.S. PATENT DOCUMENTS

| | | | | |
|---|---|---|---|---|
| 3,909,618 | A | * | 9/1975 | Fujii et al. .......................... 307/3 |
| 6,950,460 | B1 | * | 9/2005 | Cappelletti et al. ........... 375/222 |

(Continued)

FOREIGN PATENT DOCUMENTS

| | | |
|---|---|---|
| EP | 1 499 033 | 1/2005 |
| EP | 1 892 843 | 2/2008 |

(Continued)

OTHER PUBLICATIONS

U.S. Appl. No. 13/502,774, filed Jun. 11, 2012, Schwager, et al.
International Search Report Issued Aug. 14, 2009 in PCT/EP09/003303 filed May 8, 2009.
Combined Office Action and Search Report issued Apr. 1, 2013 in Chinese Patent Application No. 200980131287.9 (with English language translation and English translation of category of cited documents).

(Continued)

*Primary Examiner* — Dai A Phuong
(74) *Attorney, Agent, or Firm* — Oblon, Spivak, McClelland, Maier & Neustadt, L.L.P.

(57) ABSTRACT

A method for detecting an ingress of a short wave radio signal in a power line communication system which determines a strength of a common mode signal at a frequency of the power line communication system during a time period when no communication in the power line communication system at this frequency takes place and an ingress is detected if the strength of the common mode signal is above a determined threshold. A corresponding power line communication modem can implement such a method.

9 Claims, 4 Drawing Sheets

(56) References Cited

U.S. PATENT DOCUMENTS

| | | |
|---|---|---|
| 2005/0035850 A1* | 2/2005 | Schwager et al. ....... 340/310.01 |
| 2006/0018399 A1* | 1/2006 | Miyazakii et al. ............ 375/295 |
| 2006/0208742 A1* | 9/2006 | Tsudaka et al. .............. 324/532 |
| 2007/0268063 A1* | 11/2007 | Wasaki et al. ................ 327/532 |
| 2008/0057866 A1* | 3/2008 | Schwager et al. ........... 455/41.1 |
| 2008/0107242 A1 | 5/2008 | Ichihara et al. |
| 2010/0061433 A1* | 3/2010 | Stadelmeier et al. ......... 375/222 |

FOREIGN PATENT DOCUMENTS

| | | |
|---|---|---|
| JP | 2005-51768 A | 2/2005 |
| WO | 2006 068327 | 6/2006 |

OTHER PUBLICATIONS

Office Action, with an English translation, issued Mar. 6, 2013, issued in corresponding Russian application 2011109037 filed May 8, 2009.

* cited by examiner

METHOD FOR DETECTING AN INGRESS OF A SHORT-WAVE RADIO SIGNAL IN A POWER LINE COMMUNICATION SYSTEM AND POWER LINE COMMUNICATION MODEM

An embodiment of the invention relates to a method for detecting an ingress of a short wave radio signal in a power line communication system. A further embodiment of the invention relates to a power line communication modem.

BACKGROUND

Power line communication (PLC), also called mains communication, power line transmission or power line telecommunication (PLT), broadband power line (BPL), power band or power line networking (PLN) is a term describing several different systems for using power distribution wires for simultaneous distribution of data. A carrier can communicate voice and data by superimposing an analog signal of a standard 50 or 60 Hz alternating current (AC). For indoor applications, PLC equipment can use household electrical power wiring as a transmission medium. This is a technique used e.g. for home networking or in home automation for remote control of lighting and appliances without installation of additional wiring.

In standard PLC systems the signals are transmitted and received in a differential mode (DM). Differential mode signaling is a method of transmitting information over pairs of wires. At DM signaling one wire carries a signal and the other wire carries the inverse of the signal, so that the sum of the voltages to ground on the two wires is always assumed to be zero. PLC modems therefore inject a DM signal between a neutral line and the phase line of an outlet of the power line network of the household for communication purposes. Another PLC modem can receive such DM signals at another outlet and use the DM signal for controlling an appliance associated with the receiving PLC modem.

However, at in-house power line grids, there are asymmetric elements between the phase line and the neutral line, like e.g. an open light switch, the current bar and the fuse cabinet, branches, etc. At these asymmetric elements, the DM signals injected by PLC modems are converted to common mode (CM) signals. Multiple input-multiple output PLC modems can use different channels, in particular also common mode signals, in order to enhance the coverage of PLC systems.

Fixed radio broadcasting or other external transmissions might have interferences with power line communication. PLC modems might have fixed notch filters for amateur radio bands. Concepts of dynamic or smart notching, e.g. like specified in ETSI TS 102 578, enables PLC modems to depict an ingress of fixed radio broadcast stations. The frequency where radio stations have been detected should be omitted by power line communication. In order to realize such an omission in a PLC transmitter, adaptive notch filters for suppressing a transmission signal in a predetermined frequency band might be used. There is a need of further improvements in detecting an ingress of short wave radio signals.

BRIEF SUMMARY

It is an object of the invention to provide a method for detecting an ingress of a short wave radio signal and a power line communication modem with improved capabilities to detect the ingress.

This object is solved by a method and a power line communication modem according to claims 1 and 5.

Further details of the invention will become apparent from a consideration of the drawings and ensuing description.

BRIEF DESCRIPTION OF THE SEVERAL VIEWS OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of the embodiments will be readily appreciated, as they become better understood by reference to the following detailed description. The elements of the drawings are not necessarily to scale relative to each other. Like reference numerals designate corresponding similar parts.

DETAILED DESCRIPTION

In the following, embodiments of the invention are described. It is important to note that all described embodiments in the following may be combined in any way, i.e. there is no limitation that certain described embodiments may not be combined with others. Further, it should be noted that same reference signs throughout the Figures denote same or similar elements.

It is to be understood that other embodiments may be utilized and structural or logical changes may be made without departing from the scope of the invention. The following detailed description, therefore, is not to be taken in a limiting sense, and the scope of the present invention is defined by the appended claims.

It is to be understood that the features of the various embodiment described herein may be combined with each other, unless specifically noted otherwise.

Figure 1:
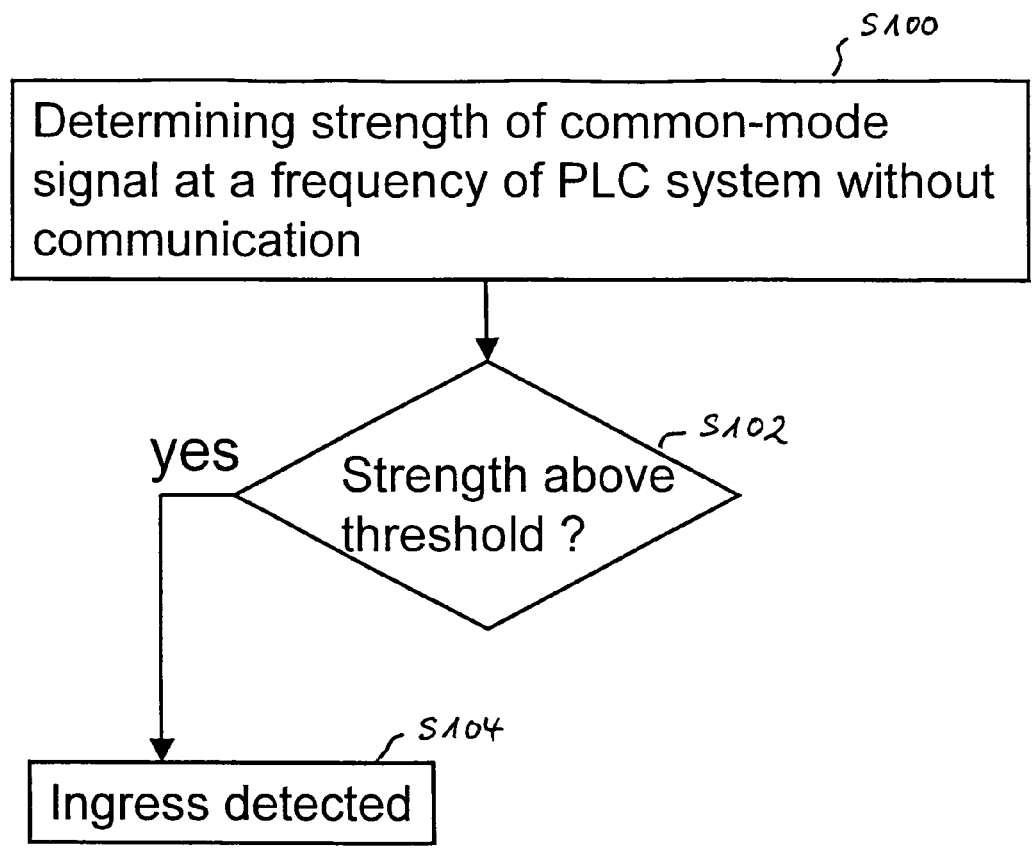
FIG. 1 shows a schematic flowchart of an embodiment of the invention.

In FIG. 1 a schematic flowchart of a method for detecting an ingress of the short wave radio signal in a power line communication is depicted.

In step S100 a strength of a common mode signal at a frequency of a power line communication system is determined during a time period when no communication in the power line communication system at this frequency takes place. Since no communication in the power line communication system takes place a common mode signal at this frequency indicates that an external source or some noise is present at this frequency. The term "frequency" might be understood in the context of this application also as "frequency band", which is used for communicating within the power line communication system.

The strength of the common mode signal might be an amplitude of the signal or a power of the signal at the frequency.

In step S102 it is determined whether the strength of the common mode signal is above a predetermined threshold. If the strength is above the predetermined threshold then an ingress is detected (S104), otherwise no ingress is determined.

Common mode signals (CM) carry the ingress information of short wave radio broadcast signals with a higher volume than differential mode signals (DM). Thus, detection can be performed with a higher certainty using common mode signals than using different mode (DM) signal. CM signals might show a higher level than DM signals since DM mode signals are converted by the asymmetry of the power line network. There will be less false detections in identifying the ingress of available broadcast services. Unintended noise sources to the power line can be separated from radio broadcast ingress by comparing differential mode and common mode signals. Usually appliances feed noise in differential mode to power lines.

Different predetermined thresholds might be used for different frequencies or frequency bands. Thus, when determining respective strengths of common mode signals at respective different frequencies during the time period when no communication in the power line communication system takes place at the respective frequencies, comparing the respective strength with respective thresholds and detecting the ingress with at least one of the respective strengths is above the respective threshold it is possible to identify different frequencies for which ingresses are present.

Figure 2:
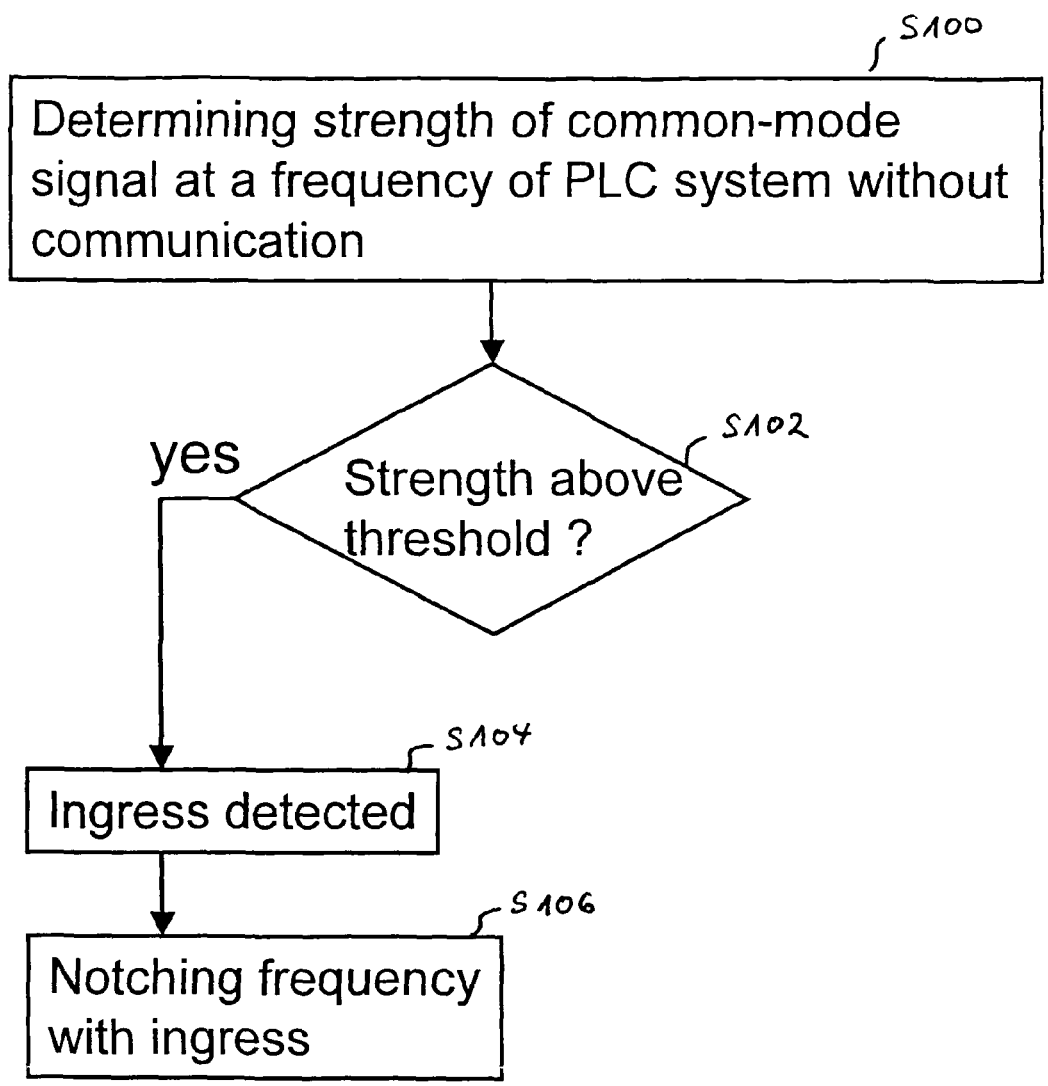
FIG. 2 shows a schematic flowchart of a further embodiment of the invention.

In FIG. 2 a flowchart of a further embodiment is depicted. After an ingress is detected in S104 the frequency with the ingress is notched during transmission of power line communication signals in the power line communication system (S106). The frequency is notched, e.g. by not using a frequency carrier which might influence the frequency of the ingress. Thus, there is no disturbing interference with external short wave radio signals when using the power line communication system. Therefore, a coexistence of power line communication systems with short wave radio signals or broadcast radio signals is possible. If ingresses at a plurality of different frequencies or frequency bands are detected, the corresponding plurality of different frequencies might be notched during communication over the power line communication network.

Figure 3:
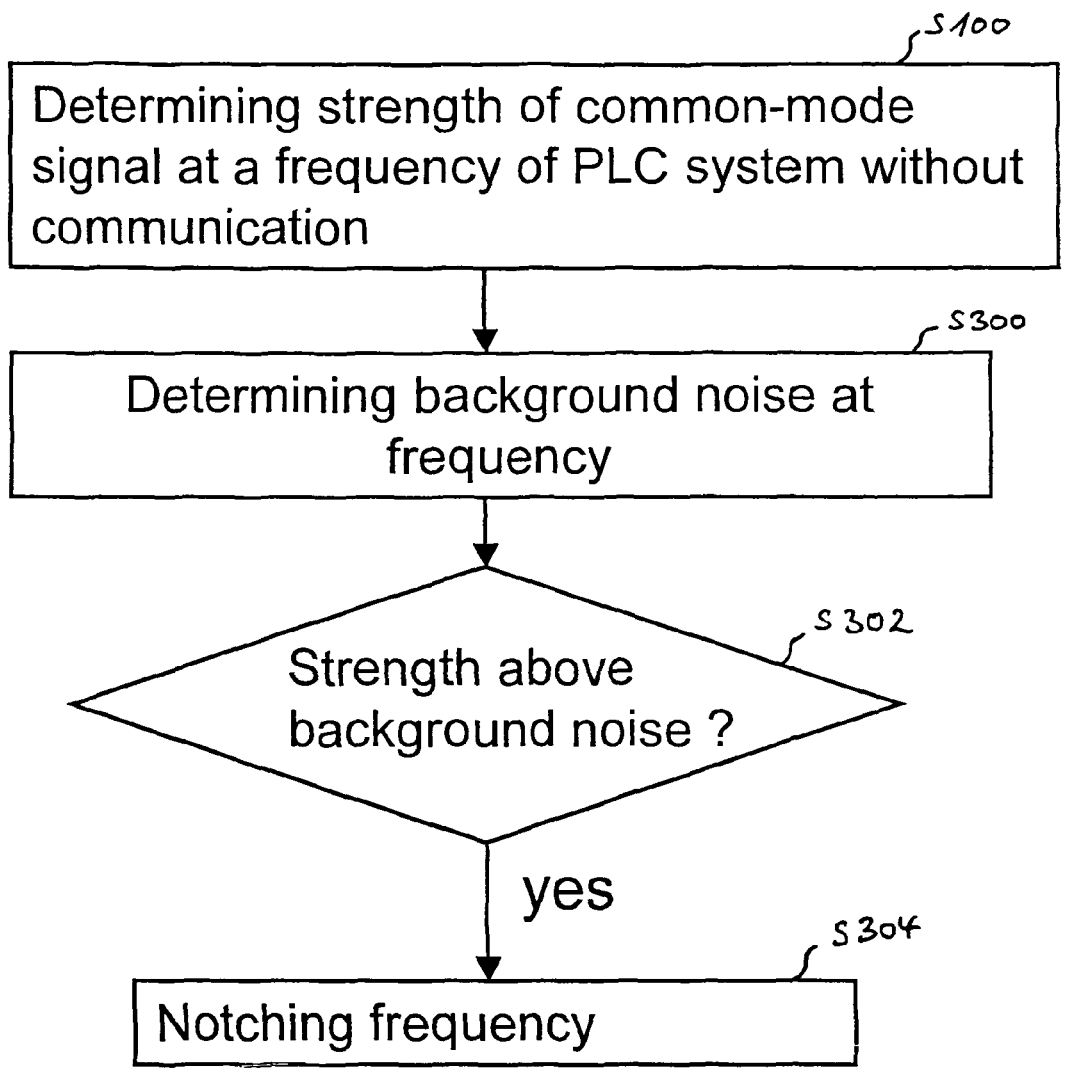
FIG. 3 shows a schematic flowchart of a further embodiment of the invention.

In FIG. 3 a further flowchart is depicted. In step S100 the strength of a common mode signal at a frequency of a power line communication system is determined when no communication in the power line communication system at this frequency takes place.

In step S300 the background noise is determined. The background noise might be determined by measuring the noise level in frequency bands adjacent to the frequency band used for radio broadcasting, like it is explained more in detail e.g. in ETSI TS 102 578.

If the strength is a predetermined value above the background noise (S302) then the corresponding frequency band is notched during transmission of power line communication signals (S304). Notching only frequency bands for which the strength of the common mode signal lies the predetermined value above the background noise further enhances the number of possible frequency bands. It is not necessary to notch frequency bands where the background noise is strong, since in this case it is not possible to receive the short wave radio broadcast signals in sufficient quality even without having a parallel power line communication system working. The predetermined value might be e.g. 14 dB.

Figure 4:
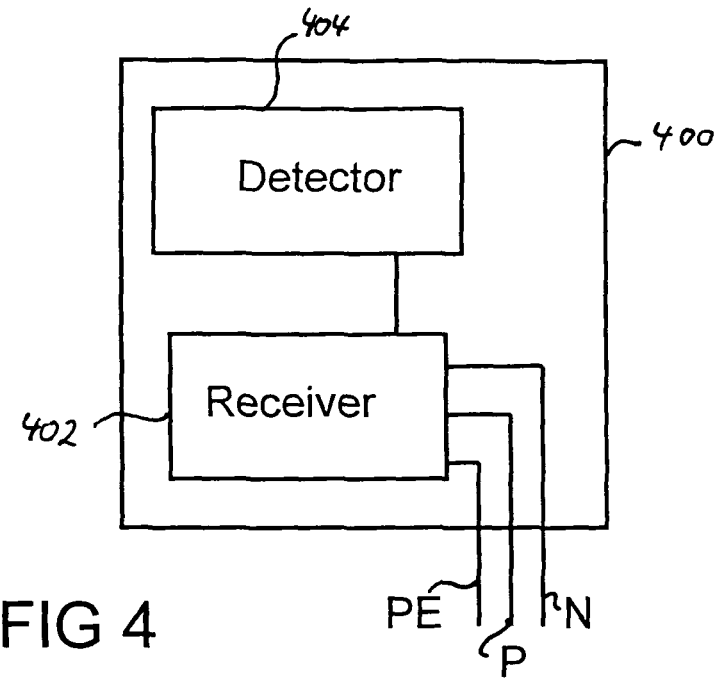
FIG. 4 shows an embodiment of a power line communication modem.

In FIG. 4 a power line communication modem 400 is depicted. The power line communication modem 400 comprises a receiver 402 which is configured to determine a strength of the common mode signal and a frequency of the power line communication system during a time period where no communication in the power line communication system at this frequency takes place and the detector 404 which is configured to detect the ingress if the strength of the common mode signal is above a predetermined threshold.

The receiver 402 is connected to three lines of the power line network, a protective earth line PE, a phase line P and a neutral line N.

Figure 5:
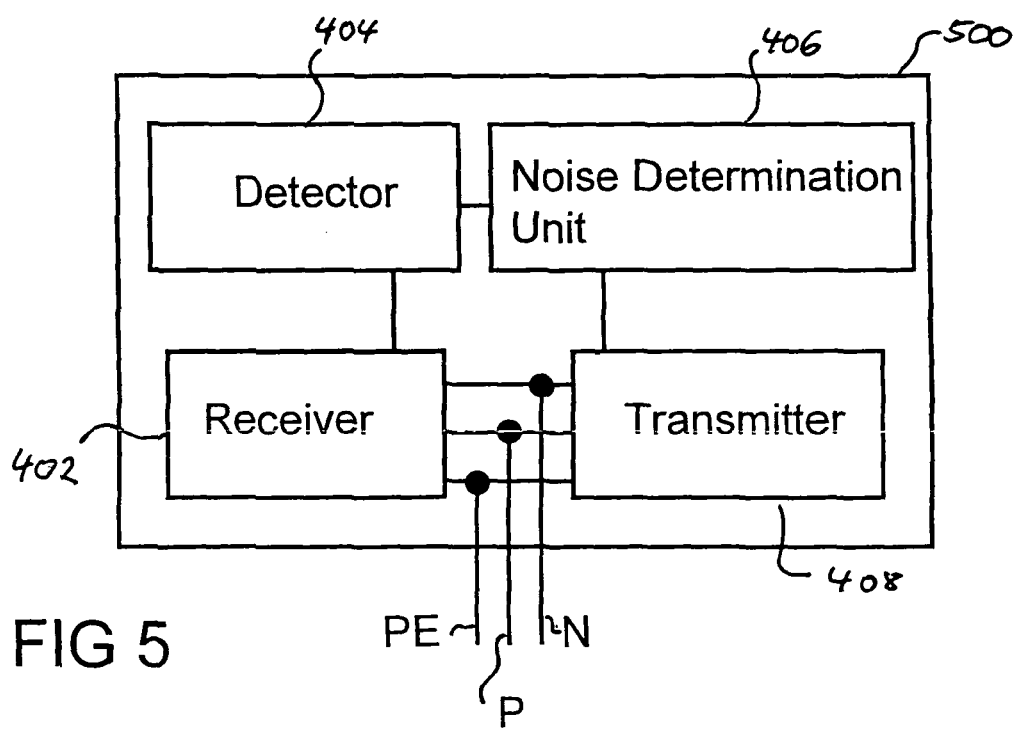
FIG. 5 shows a further embodiment of a power line communication modem.

In FIG. 5 a further embodiment of a power line communication modem 500 is depicted. Besides the receiver 402 and the detector 404 the power line communication modem 500 further comprises a noise determination unit 406 which is configured to determine the background noise at the frequency. Further, the power line communication modem 500 comprises a transmitter 408 which is also connected to the protective earth line PE, the phase line P and the neutral line N. The transmitter 408 is configured to notch a frequency or a plurality of frequencies or frequency bands during transmission of power line communication signals for which the strength of the common mode signal lies a predetermined value above the background noise.

The receiver 402 has the ability to receive differential mode (DM) signals between phase P and neutral N, phase P and protection earth PE, neutral N and protective earth PE and common mode CM. Common mode signals carry the information of the ingress of radio broadcast signals louder than differential mode signals. Thus the power line communication modem 400, 500 can access the common mode signals and detect the ingress with a less sensitive analog front end (AFE) or with a better certainty.

Multiple input-multiple output (MIMO) power line communication modems may have the ability to measure common mode signals. This ability can be reused to identify the existence of short wave radio broadcasts.

When comparing the strength of at least one differential mode signal between phase line and neutral line, phase line and protective earth line, and neutral line and protective earth line at the frequency of the power line communication system during the time period when no communication in the power line communication system at this frequency takes place, and the strengths of common mode signals an unintended noise injected by any device connected to the mains can be identified as well. This reduces the risk of false detection at dynamic adaptive notching. Usually any unintended noise injected to the mains has a stronger differential mode signal than the common mode signal.

With the method and power line communication modem better dynamic (or smart or adaptive) notching is achieved.

Although specific embodiments have been illustrated and described herein, it will be appreciated by those of ordinary skill in the art that a variety of ultra net and/or equivalent implementations may be substituted for the specific embodiments shown and described without departing from the scope of the described embodiments. This application is intended to cover any adaptations or variations of the specific embodiments discussed herein. Therefore, it is intended that this invention be limited only by the claims and the equivalents thereof.

The invention claimed is:

1. A method for detecting an ingress of a short-wave radio signal in a power line communication system comprising:
   determining a strength of a common-mode signal at a frequency of the power line communication system during a time period when no communication in the power line communication system at this frequency takes place, wherein the power line communication system includes at least two conductors, and the common-mode signal is a signal that is present with one sign and in-phase on all of the conductors; and detecting the ingress based on the strength of the common-mode signal being above a predetermined threshold, the method further including determining a strength of at least one of differential mode signals between phase line and neutral line, differential mode signals between phase line and protective earth line, and differential mode signals between neutral line and protective earth line at the frequency of the power line communication system during the time period when no communication in the power line communication system at this frequency takes place, wherein the detecting of the ingress is further based on a comparison of the strength of the at least one differential mode signals to the strength of the common mode signal.

2. The method according to claim 1 further comprising:
determining respective strengths of common-mode signals at respective different frequencies during the time period during time periods when no communication in the power line communication system at the respective frequencies takes place;
comparing the respective strengths with respective thresholds; and
detecting the ingress if at least one of the respective strengths is above the respective threshold.

3. The method according to claim 1, further comprising:
notching a frequency during transmission of power line communication signals, for which an ingress has been detected.

4. The method according to claim 1, further comprising:
determining a background noise; and
notching a frequency during transmission of power line communication signals, for which the strength of the common-mode signal is a predetermined value above the background noise.

5. A power line communication modem, comprising:
a receiver configured to determine a strength of a common-mode signal at a frequency of the power line communication system during a time period when no communication in the power line communication system at this frequency takes place, wherein the power line communication system includes at least two conductors, and the common-mode signal is a signal that is present with one sign and in-phase on all of the conductors; and
a detector configured to detect the ingress based on the strength of the common-mode signal being above a predetermined threshold,
wherein the receiver is further configured to determine a strength of at least one of differential mode signals between phase line and neutral line, differential mode signals between phase line and protective earth line, and differential mode signals between neutral line and protective earth line at the frequency of the power line communication system during the time period when no communication in the power line communication system at this frequency takes place, and the detector is further configured to detect the ingress based on a comparison of the strength of the at least one differential mode signals to the strength of the common mode signal.

6. The power line communication modem according to claim 5, wherein the receiver is further configured to determine respective strengths of common-mode signals at respective different frequencies during the time period during time periods when no communication in the power line communication system at the respective frequencies takes place; and
wherein the detector is further configured to compare the respective strengths with respective thresholds and to detect the ingress if at least one of the respective strengths is above the respective threshold.

7. The power line communication modem according to claim 5, further comprising:
a transmitter configured to notch a frequency during transmission of power line communication signals, for which an ingress has been detected.

8. The power line communication modem according to claim 7, wherein the power line communication modem is configured to receive and to transmit power line communication signals in a multiple input multiple output scheme.

9. The power line communication modem according to claim 5, further comprising:
a noise determination unit configured to determine a background noise; and
a transmitter configured to notch a frequency during transmission of power line communication signals, for which the strength of the common-mode signal is a predetermined value above the background noise.

* * * * *